Patented Oct. 27, 1936

2,058,911

UNITED STATES PATENT OFFICE 2,058,911

PROCESS FOR THE PURIFICATION OF NAPHTHYLAMINE SULPHONIC ACID

Herbert V. Rapp, Buffalo, N. Y., assignor to National Aniline & Chemical Co., Inc., New York, N. Y., a corporation of New York No Drawing. Application December 8, 1931, Serial No. 579,825

8 Claims. (Cl. 260—129)

This invention relates to the purification of 2-naphthylamine-1-sulphonic acid obtained by the amidation of 2-naphthol-1-sulphonic acid.

The material 2-naphthylamine-1-sulphonic acid, known as Tobias acid, is a commercially important intermediate for the preparation of lake pigments, particularly for the production of lithol red. This acid may be produced by the process involving the treatment of 2-naphthol-1-sulphonic acid in the form of its alkali metal salt, e. g., the sodium salt, with aqua ammonia. A solution of the sodium or ammonium salts of 2-naphthylamine-1-sulphonic acid is obtained by this process, from which the acid may be recovered as the sodium salt by salting the solution with sodium chloride or as the free acid by acidifying the solution, for example, with hydrochloric or sulphuric acid. The product thus obtained, whether as the sodium salt or as the free acid, is contaminated with impurities which may be either unreacted materials used in the preparation of the 2-naphthylamine-1-sulphonic acid or the products of side reactions which take place. When 2-naphthylamine-1-sulphonic acid or its sodium salt is to be employed as an intermediate in the production of lithol red, however, a high purity of the intermediate is required to give a good quality red pigment.

It is an object of this invention to provide a process for the production of 2-naphthylamine-1-sulphonic acid of a high degree of purity and particularly suitable for use as an intermediate for the production of lake pigments.

In operating in accordance with this invention, an aqueous solution of a soluble salt of 2-naphthylamine-1-sulphonic acid obtained by the amidation of 2-naphthol-1-sulphonic acid, is agitated with a water immiscible organic solvent liquid, for example dichlorbenzene or monochlorbenzene, and the liquid containing impurities absorbed from the aqueous solution is removed from contact therewith. In its preferred embodiment, the invention comprises successively treating an aqueous solution of the sodium or ammonium salt of the above 2-naphthylamine-1-sulphonic acid with separate proportions of dichlorbenzene by agitating the solution with the dichlorbenzene at a temperature of about 65°–95° C. Each portion of dichlorbenzene after being thus thoroughly mixed with the aqueous solution is allowed to separate from the solution and is removed, carrying with it the impurities absorbed from the solution of 2-naphthylamine-1-sulphonic acid. The thus purified aqueous solution may be treated, as for example, by the addition of hydrochloric acid, to precipitate and recover from it free 2-naphthylamine-1-sulphonic acid. After washing the precipitate with water, it is suitable for use as an intermediate in the preparation of a lake pigment.

The following example is illustrative of the process of this invention but it is to be understood that the invention is not to be limited to the specific details set forth.

An aqueous solution of crude 2-naphthylamine-1-sulphonic acid in the form of its soluble sodium or ammonium salts is obtained by heating the sodium salt of 2-naphthol-1-sulphonic acid with aqua ammonia and sodium bisulphite in an autoclave at a temperature of about 123° C.

After completion of the amidation reaction the reaction mixture is diluted with water, heated and filtered. The filtrate contains the crude 2-naphthylamine-1-sulphonic acid in solution as the sodium and/or ammonium salts and is ammoniacal due to the presence of ammonia. To the solution heated and maintained at a temperature of about 65°–95° C., there is added a portion of crude o-dichlorbenzene and the mixture agitated, for example, by means of an impeller agitator. About 40 pounds of the dichlorbenzene is added to the aqueous solution obtained by the amidation treatment of about 125 pounds of the sodium salt of 2-naphthylamine-1-sulphonic acid. After agitating this mixture for about thirty minutes, the agitation is stopped and the dichlorbenzene allowed to settle from the aqueous layer and is then drawn off. The residual aqueous liquor is twice extracted in a similar manner with separate portions of about 40 pounds each of the dichlorbenzene. The resulting purified aqueous solution may then be cooled to about 45° C. and made acid to Congo Red by addition of hydrochloric acid. The acidified liquor is further cooled to about 25° C. and the precipitate of 2-naphthylamine-1-sulphonic acid filtered off and washed with water. The purified free acid thus obtained is suitable for use as an intermediate in the preparation of lake pigments. For example, when diazotized and coupled with beta-naphthol it gives a lithol red which is brighter than the lithol red similarly prepared from a 2-naphthylamine-1-sulphonic acid product obtained by a process as outlined above but omitting the purification treatment with dichlorbenzene.

The invention is particularly applicable to the purification of a crude 2-naphthylamine-1-sulphonic acid which has been prepared by the amidation of 2-naphthol-1-sulphonic acid by means of ammonia with or without a salt such as ammonium chloride or ammonium sulphite or sodium bisulphite being added to the reaction mixture.

In place of the crude o-dichlorbenzene used in the above example, other water immiscible organic solvents may be employed, for example, monochlorbenzene or another dichlorbenzene, or liquid hydrocarbons or their substitution products which do not react with naphthylamine-sulphonic acid, such as trichlorbenzene, carbon tetrachloride, tetrachlorethane, benzene, solvent naphtha, amyl acetate and methyl benzoate.

I claim:

1. The process for the purification of the naphthylamine sulphonic acid obtained by reacting 2-naphthol-1-sulphonic acid with ammonia which comprises removing impurities from said naphthylamine sulphonic acid by extracting an aqueous solution of a soluble salt thereof with a water immiscible organic liquid solvent for said impurities which is an esterified carboxylic acid and which is inert towards said naphthylamine sulphonic acid.

2. The process for the purification of naphthylamine sulphonic acid obtained by reacting 2-naphthol-1-sulphonic acid with ammonia which comprises treating an aqueous solution of a soluble salt of said naphthylamine sulphonic acid with a water immiscible organic liquid solvent for said impurities which does not react with said naphthylamine sulphonic acid.

3. The process for the purification of naphthylamine sulphonic acid obtained by reacting 2-naphthol-1-sulphonic acid with ammonia which comprises treating an aqueous solution of a soluble salt of said naphthylamine sulphonic acid with a chlorbenzene.

4. The process for the purification of naphthylamine sulphonic acid obtained by reacting 2-naphthol-1-sulphonic acid with ammonia which comprises successively treating an aqueous solution of a soluble salt of said naphthylamine sulphonic acid with a plurality of separate portions of a water immiscible organic liquid solvent for said impurities which does not react with said naphthylamine sulphonic acid and separating each of said portions containing absorbed impurities from contact with the aqueous solution.

5. The process for the purification of an aqueous solution of naphthylamine sulphonic acid obtained by reacting a soluble salt of 2-naphthol-1-sulphonic acid with ammonia which comprises treating said solution with dichlorbenzene to absorb impurities contained in said solution in the dichlorbenzene.

6. The process for the purification of an aqueous solution of naphthylamine sulphonic acid obtained by reacting a soluble salt of 2-naphthol-1-sulphonic acid with ammonia which comprises successively and separately agitating said solution with a plurality of portions of a chlorbenzene and removing the chlorbenzene containing absorbed impurities from contact with the solution of naphthylamine sulphonic acid.

7. The process for the purification of an aqueous solution of naphthylamine sulphonic acid obtained by reacting the sodium salt of 2-naphthol-1-sulphonic acid with ammonia which comprises successively agitating said solution at a temperature of about 65° C. to about 95° C. with a plurality of separate portions of dichlorbenzene and separating each of said portions containing absorbed impurities from contact with the solution of the naphthylamine sulphonic acid.

8. The process for the purification of naphthylamine sulphonic acid obtained by reacting 2-naphthol-1-sulphonic with ammonia which comprises removing impurities from said naphthylamine sulphonic acid by extracting an aqueous solution of a soluble salt thereof with a water immiscible organic liquid solvent for said impurities which is a chlorinated hydrocarbon and which is inert towards said naphthylamine sulphonic acid.

HERBERT V. RAPP.